United States Patent
Yu et al.

(10) Patent No.: US 8,023,815 B2
(45) Date of Patent: Sep. 20, 2011

(54) CAMERA LENS ASSEMBLY AND AUTOFOCUSING METHOD THEREFOR

(75) Inventors: Hyun-Ho Yu, Seoul (KR); Doo-Sik Shin, Suwon-si (KR); Young-Kwon Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/606,750

(22) Filed: Oct. 27, 2009

(65) Prior Publication Data

US 2010/0111514 A1    May 6, 2010

(30) Foreign Application Priority Data

Oct. 28, 2008  (KR) ................. 10-2008-0105832

(51) Int. Cl.
*G03B 13/32* (2006.01)
(52) U.S. Cl. .................................................. 396/90
(58) Field of Classification Search .......... 396/89, 396/90, 535, 541; 348/190, 197
See application file for complete search history.

(56) References Cited

U.S. PATENT DOCUMENTS

| | | | | |
|---|---|---|---|---|
| 5,905,921 A * | 5/1999 | Miyazawa | | 396/300 |
| 6,972,797 B2 * | 12/2005 | Izumi | | 348/348 |
| 7,646,970 B2 * | 1/2010 | Sakaguchi | | 396/91 |
| 7,688,664 B2 * | 3/2010 | Yamaguchi | | 365/225.7 |
| 2002/0102102 A1 * | 8/2002 | Watanabe et al. | | 396/89 |
| 2002/0154240 A1 * | 10/2002 | Tamai et al. | | 348/345 |
| 2003/0007797 A1 * | 1/2003 | Onozuka et al. | | 396/85 |
| 2008/0219655 A1 * | 9/2008 | Yoon et al. | | 396/127 |

\* cited by examiner

*Primary Examiner* — Clayton E Laballe
*Assistant Examiner* — Dennis Hancock
(74) *Attorney, Agent, or Firm* — The Farrell Law Firm, P.C.

(57) ABSTRACT

Provided is a method for focusing a camera lens assembly, the focusing method including assembling a lens and a camera device; measuring an actual distance between the lens and the camera device in an assembled position; inputting a difference of the actual distance from a focal length of the lens; and when power is applied to the camera lens assembly, adjusting a distance between the lens and the camera device according to the offset value, such that the distance between the lens and the camera device becomes equal to the focal length of the lens.

14 Claims, 3 Drawing Sheets

CAMERA LENS ASSEMBLY AND AUTOFOCUSING METHOD THEREFOR

PRIORITY

This application claims priority to an application entitled "Camera Lens Assembly and Autofocusing Method Therefor" filed in the Korean Industrial Property Office on Oct. 28, 2008 and assigned Serial No. 10-2008-0105832, the contents of which are incorporated herein by reference.

BACKGROUND OF THE INVENTION

1. Field of the Invention

The present invention relates generally to a camera lens assembly, and more particularly to a camera lens assembly mounted to a portable personal device, such as a cellular phone or a Personal Digital Assistant (PDA), and an autofocusing method therefor.

2. Description of the Related Art

In recent years, it has been possible to reduce the size and weight of a camera, which is a device that photographs a subject, by using a camera device, such as a Charge-Coupled Device (CCD) or a Complementary Metal-Oxide Semiconductor (CMOS) to capture an image of a subject. Accordingly, a camera lens assembly is mounted to a portable personal device, such as a cellular phone or a PDA, and enables a user of the portable personal device to conveniently photograph a subject. With the growth of technology for such a camera device, a portable personal device has encroached on the digital camera market.

Due to difficulties in reducing the size and weight of a lens assembly, there have been limitations in incorporating an optical zoom function into a compact and lightweight camera lens assembly. However, as the size of a lens is reduced and the precision of a lens driving apparatus is improved, the optical zoom function, an autofocusing function, and other camera functions are being incorporated into camera lens assemblies mounted to portable personal devices. Among others, the autofocusing function has gradually become an essential function for a camera lens assembly mounted to a portable personal device. The autofocusing function automatically adjusts the distance between a lens and a camera device according to a distance between the camera device and a subject, thereby allowing an image of the subject to be clearly projected onto an image plane.

In manufacturing a camera lens assembly, setting the distance between a lens and a camera device is a main factor determining the quality of the camera lens assembly. In other words, independent of the autofocusing function, a camera lens assembly including a camera device and a lens must be designed such that the distance between the lens and the camera device corresponds to the focal length of the lens when the assembly is initially driven.

Technology related to such initial focusing is disclosed in Korean Patent Registration No. 773,405, filed on Nov. 22, 2006 (hereinafter, '405). According to the '405 patent, an operator fixes the initial position of a lens through an initial focusing, in which the manufacture of a camera module is finished. Then, the finished camera module passes through a pre-delivery quality inspection for determining whether the initial focusing of the camera module was accurately performed, and then the camera module is delivered from the factory. With regard to this initial focusing and inspection, equipment, such as an index table, an adjustment unit, and a rotating unit driven by a cylinder, is required for the initial focusing, and particularly a module holder for facilitating the initial focusing is described in the above patent.

However, since the above-described conventional camera lens assembly process requires separate machinery (e.g. the module holder) for the initial focusing in the assembled state, the conventional camera lens assembly process has a disadvantage in that it requires a complex structure and expensive manufacturing equipment, such as an index table, an adjustment unit, and a rotating unit. Moreover, when the standard external dimension of a camera lens assembly is changed, a separate jig or holder must be manufactured accordingly, which increases costs. Furthermore, since an operator must manually perform focusing for each camera lens assembly, there is a disadvantage in that a large amount of time and labor are required for the manufacture of a camera lens assembly.

SUMMARY OF THE INVENTION

Accordingly, the present invention has been made to solve at least the above-mentioned problems occurring in the prior art, and the present invention provides a camera lens assembly and a focusing method therefor, which can save manufacturing costs by minimizing the manufacture of equipment and a jig for initial focusing.

Also, the present invention provides a camera lens assembly and a focusing method simplifying manufacturing processes and reducing a fatigue of manufacturing labors by facilitating an initial focusing of the camera lens assembly in the assembled state.

In accordance with an aspect of the present invention, there is provided a focusing method for a camera lens assembly, the method including assembling a lens and a camera device; measuring an actual distance between the lens and the camera device in a position where the lens and the camera device are assembled; inputting a difference of the actual distance from a focal length of the lens; and when power is applied to the camera lens assembly, adjusting a distance between the lens and the camera device according to the input offset value, such that the distance between the lens and the camera device is set equal to the focal length of the lens.

In accordance with another aspect of the present invention, there is provided a camera lens assembly including a housing having an upper cover and a lower cover; a lens assembly including at least one lens; a guide unit for guiding the lens assembly movably in an optical axis direction of the lens; a camera device provided on the lower cover; and an encoder for moving the lens in the optical axis direction thereof, wherein when power is applied to the camera lens assembly, the lens is moved by driving the encoder, so that a distance between the lens and the camera device coincides with a focal length of the lens.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENT OF THE INVENTION

Figure 1:
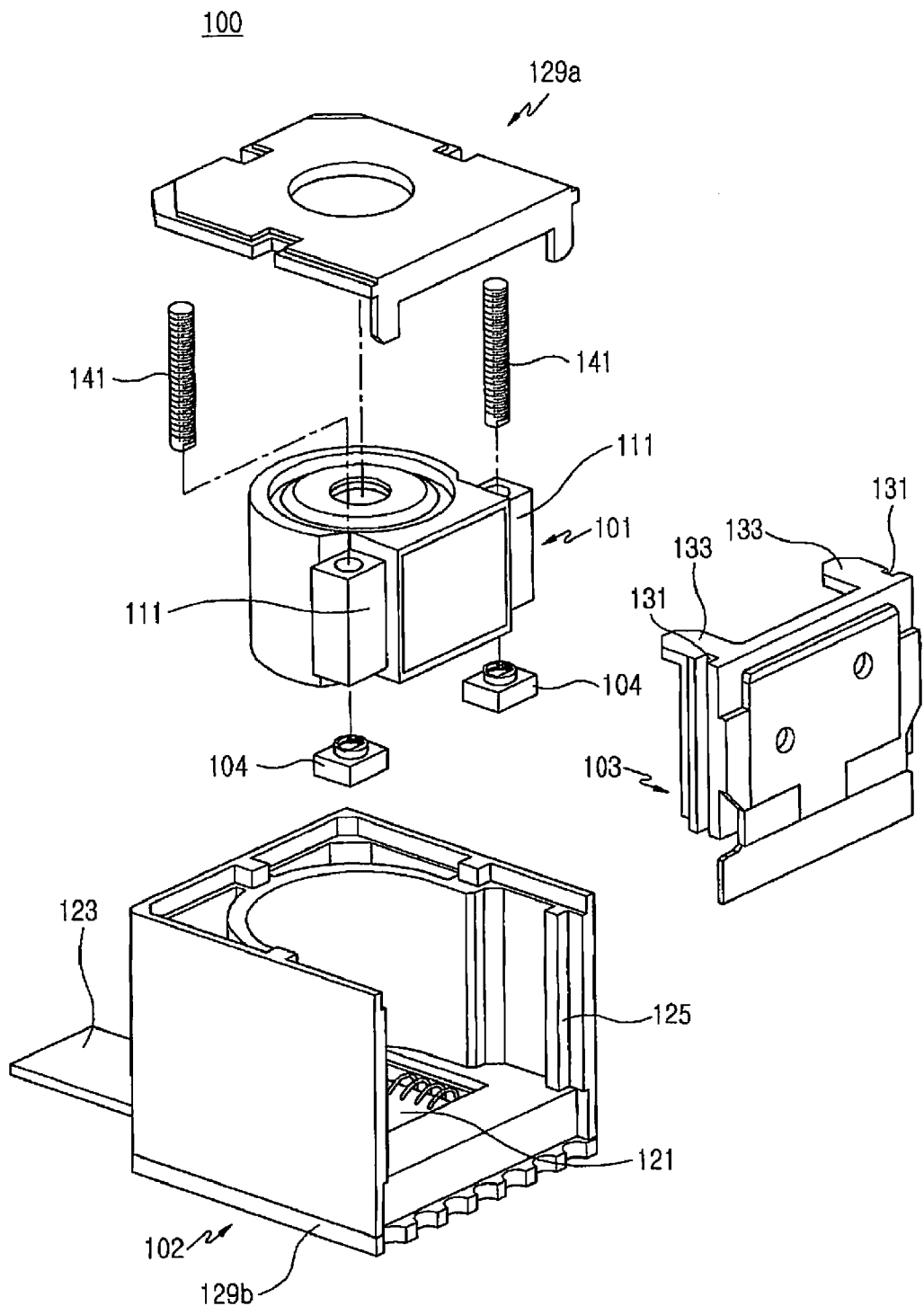
FIG. 1 is an exploded perspective view of a camera lens assembly in accordance with an embodiment of the present invention.

Hereinafter, embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the present invention in unnecessary detail.

Figure 2:
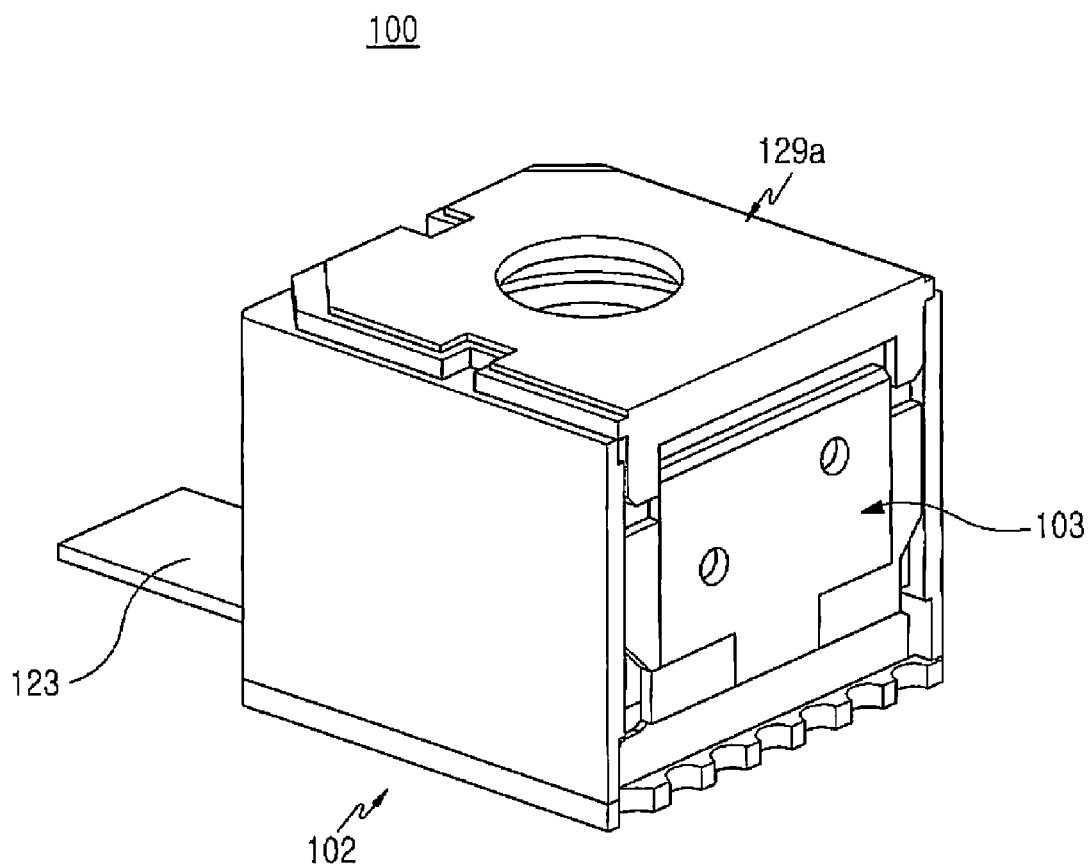
FIG. 2 is an assembled perspective view of the camera lens assembly shown in FIG. 1.

FIGS. 1 and 2 illustrate a camera lens assembly 100 according to an embodiment of the present invention. Referring to FIGS. 1 and 2, the camera lens assembly 100 includes a lens assembly 101, a housing 102, a guide unit 103, a camera device 121, and an encoder 104.

The lens assembly 101 includes at least one lens, and is provided movably along the optical axis direction of a lens within the housing 102. The lens (not shown) is provided inside of the lens assembly 101. The lens assembly 101 is formed on a peripheral surface of the lens and has driven members 111 that extend parallel to the optical axis direction of the lens. As will be described below, the driven members 111 are coupled with driving members 141 of the encoder 104 to move the entire lens assembly 101 according to the operation of the encoder 104.

The housing 102 has an upper cover 129a and a lower cover 129b, and the camera device 121 is received within the housing 102. The camera device 121 has a flexible printed circuit 123 that extends from one side of the camera device 121 to the outside of the housing 102. The upper and lower surfaces of the housing 102 are closed by the upper and lower covers 129a, 129b respectively, and one side of the housing 102 is opened even when the upper and lower covers 129a, 129b are assembled. The guide unit 103 is attached to the opened side of the housing 102 to wholly close the inner space of the housing 102.

The guide unit 103 serves to guide the movement of the lens assembly 101 along the optical axis direction of the lens, and is formed at either the upper or lower end of the guide unit 103 with stopper ribs 133 that face the driven members 111 of the lens assembly 101. This embodiment illustrates a structure in which a pair of stopper ribs 133 is formed at the upper end of the guide unit 103. To facilitate the assembly and assembly positioning of the guide unit 103, the housing 102 and the guide unit 103 may be formed with rails 125 and grooves 131 respectively.

In a conventional camera lens assembly, the guide unit is mounted to the housing in such a manner that there remains a distance of 0.15 mm between the upper cover and the guide unit, and there remains a distance of 0.2 mm between the lower cover and the guide unit. These distances are needed to perform initial focusing, that is, to coincide a distance between the lens and the camera device with the focal length of the lens in the assembled state. In other words, once the guide unit and the lens assembly are assembled to the housing, initial focusing is performed while the guide unit is moved in the optical axis direction of the lens, and then the guide unit is adhered or fused to the housing. As mentioned above, the conventional camera lens assembly requires equipment and labor for the initial focusing after the assembly, which increases manufacturing costs. Also, in the adhesion or fusion process subsequent to the initial focusing, the position of the guide unit relative to the housing may vary, and resulting in an increased defective rate.

By contrast, in the camera lens assembly 100 according to an embodiment of the present invention, the guide unit 103 is manufactured in a structure in which the distance between the guide unit 103 and the upper cover 129a and the distance between the guide unit 103 and the lower cover 129b are eliminated, and the guide unit 103 comes into close contact with the upper and lower covers 129a, 129b by increasing the optical axial length of the guide unit 103 by 0.17 mm and 0.18 mm at its upper and lower ends respectively. In this way, when power is applied to the camera lens assembly 100, an initial focusing is performed by moving the lens assembly 101 in the optical axis direction according to an offset value stored in an electrical fuse memory, and thus the equipment and labor conventionally required to perform initial focusing by moving the guide unit along the optical axis direction relative to the housing can be saved.

Also, since the guide unit 103 does not need to be moved along the optical axis direction in the assembly process, the guide unit 103 can be formed integrally with the upper and lower covers 129a, 129b. This integration reduces the number of parts of the camera lens assembly 100, and contributes to a reduction in processes and costs required for the manufacture and assembly of the respective parts.

The encoder 104 is provided within the housing 102, and is used to not only perform initial focusing, but also adjust a focal length according to a distance to a subject when the subject is photographed. In this embodiment, a pair of encoders 104 is provided in such a manner as to face the bottom surfaces of the driven members 111, and each encoder 104 has the driving member 141 that is screwed into a driven member 111. By driving the encoder 104, the driving member 141 rotates to move the driven member 111 and finally the lens assembly 101 along the optical axis direction of the lens.

As described above, in the camera assembly according to the present invention, the manufacture of the camera lens assembly is completed after by measuring and storing a distance between a lens and a camera device after the lens and the camera device are assembled, which dispenses with a separate focusing process as a part of manufacturing the camera lens assembly. Since equipment or a jig and a corresponding focusing process conventionally required for focusing are not needed, there is an advantage of saving manufacturing costs. Also, some structures provided in a conventional camera lens assembly are used only for the focusing process, and thus are useless in the actual product after manufacture is completed. By contrast, since the camera lens assembly according to an embodiment of the present invention is not provided with such structures, it is possible to curtail the prime cost of the camera lens assembly, and to simplify the structure of the camera lens assembly. In addition, since, according to an embodiment of the present invention, focusing of the camera lens assembly is not manually performed by an operator, the time and labor required for the manufacture of the camera lens assembly can be reduced.

A method of performing an initial focusing of the camera lens assembly 100, will now be described with reference to FIGS. 3 and 4.

A typical camera lens assembly includes a pair of Electrical fuse (E-fuse) memories with a capacity of 6 bytes. The camera lens assembly 100 according to the above embodiment of the present invention also has a pair of E-fuse memories. One of the E-fuse memories stores the manufacturer identification code of the camera lens assembly, and the other E-fuse is available to finished product companies, such as manufacturers of portable personal devices. However, the E-fuse memory available to finished product companies has conventionally been used only as a spare memory, but has not served any practical use. In the camera lens assembly 100 according to the present invention, the E-fuse memory available to finished product companies is used for initial focusing.

Figure 3:
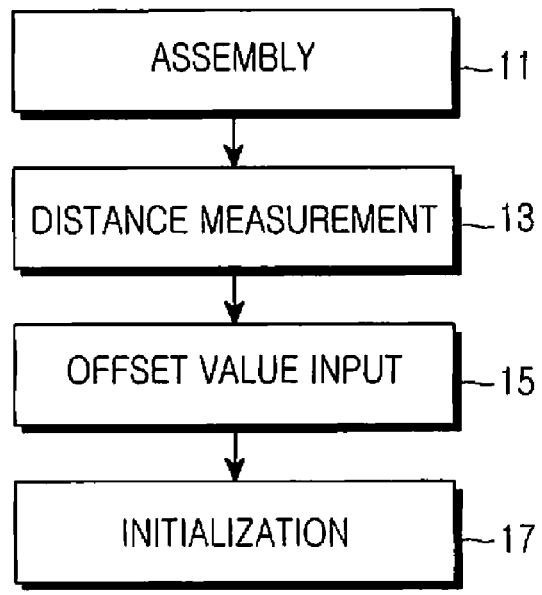
FIG. 3 is a flowchart illustrating an initial focusing process of the camera lens assembly shown in FIG. 1.
Figure 4:
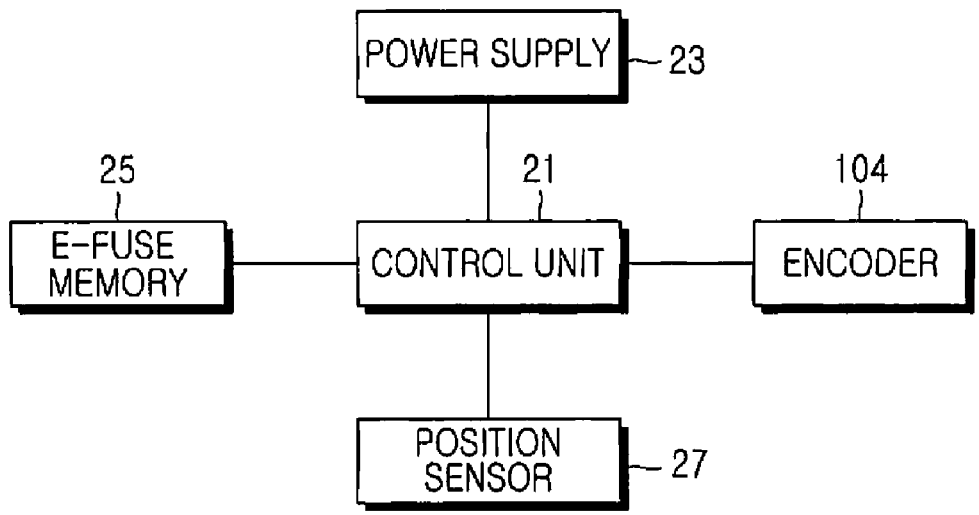
FIG. 4 is a block diagram of the camera lens assembly shown in FIG. 1.

With respect to a description of FIGS. 3 and 4, the E-fuse memory 25 may also be included in a control unit 21, although the E-fuse memory 25 is illustrated as being separated from the control unit 21 for ease of explanation.

Referring to FIG. 4, the camera lens assembly 100 includes a control unit 21 for driving the encoder 104. In the assembled state of the camera lens assembly 100, a distance between the lens and the camera device 121 may not coincide with the focal length of the lens. Thus, an initial focusing facilitated by the present invention is required. In view of product quality, it is preferred that the camera lens assembly is necessarily subjected to the initial focusing regardless of whether the distance between the lens and the camera lens already coincides with the focal length of the lens.

The initial focusing process of the camera lens assembly 100 includes an assembly step 11, a distance measurement step 13, an offset value input step 15, and an initialization step 17, and is performed, in that order, using a position sensor 27 and the E-fuse memory 25. A hall sensor may be used as the position sensor 27.

The assembly step 11 can be easily understood through the above description of the structure of the camera lens assembly 100, so a further detailed description thereof will be omitted.

The distance measurement step 13 includes measuring the actual distance between the lens and the camera device 121. In the process of a pre-delivery product test following the assembly step 11, when power is first applied to the control unit 21, the position sensor 27 (e.g., a hall sensor) detects the position of the lens and particularly the actual distance between the lens and the camera device 121.

The offset value input step 15 includes inputting and storing a difference of the actual distance between the lens and the camera device 121 from the focal length of the lens (hereinafter referred to as an "offset value") in the E-fuse memory 25. It is not necessary to measure the focal length of the lens, because the lens has been already manufactured in such a manner as to meet standards required by finished product companies.

The initialization step 17 includes moving the lens and particularly the lens assembly 101 by driving the encoder 104 according to the input offset value. When power is applied to the camera lens assembly 100, the control unit 21 moves the lens and particularly the lens assembly 101 by driving the encoder 104 according to the offset value stored in the E-fuse memory 25, thereby coinciding the actual distance between the lens and the camera device with the focal length of the lens. After moving the lens in step 17, the initial focusing of the camera lens assembly 100 is completed.

As described below, the initialization step 17 is performed not only in the initial focusing process, but also whenever power is applied to the camera lens assembly 100 so as to actually photograph a subject. Whenever power is applied to the camera lens assembly 100, the control unit 21 reads the offset value, and moves the lens assembly 101.

A comparison between a conventional initial focusing scheme and the inventive initial focusing scheme is shown below in Table 1.

TABLE 1

| Classification | conventional scheme | inventive scheme |
|---|---|---|
| initial focusing | operator forcedly moves guide unit | encoder moves lens assembly |
| adhesion/fusion of guide unit | required | unnecessary |
| quality inspection | required | required |
| driving current | unnecessary | required (about 40 mA) |

In comparison to the conventional initial focusing scheme, the initial focusing scheme according to an embodiment of the present invention does not require adhesion or fusion in the manufacturing process, and is different from the conventional scheme in that while an operator adjusts the position of a lens by forcedly moving a guide unit in the conventional scheme, an encoder to be driven in actual photographing is used for initial focusing in the inventive scheme. Also, the conventional scheme has a problem in that a guide unit may be out of position in the process of forcedly moving and then adhering/fusing the guide unit, which causes a risk of defectiveness at the stage of quality inspection. Contrarily, the inventive scheme can decrease a defective rate, because the initial position of a lens is set at the stage of quality inspection after the assembly of a camera lens assembly is completed.

The quality inspection of a camera lens assembly is a process of driving the camera lens assembly and measuring the resolution of a photographed image in the initial state. In the camera lens assembly according to the present invention, initial focusing is performed at the stage of such quality inspection. Although a current for driving the encoder is required to move the lens assembly whenever power is applied to the inventive camera lens assembly, power consumption can be minimized because a part of standby power of the camera lens assembly is used for the initial focusing.

Testing the camera lens assembly for the initial focusing is carried out by taking a picture of a subject at a distance of 10 cm when a current of 2.8 mA is applied to the encoder 104, at a distance of 10 cm when a current of 42 mA is applied to the encoder 104, and at a distance of 10 cm when a current of 76.2 mA is applied to the encoder 104, respectively.

As a result of comparing the resolutions of subject images photographed while a current applied for initial focusing is changed, the subject image photographed when a current of 40 mA or greater was applied to the encoder 104 was confirmed to be definite, which indicates that the initial focusing was performed properly. Although, in this example of the present invention, initial focusing is properly made when a current of about 40 mA is applied, those skilled in the art will understand that a current applied to the encoder 104 may be diversely changed according to the size of the actual manufactured camera lens assembly, the particular use of a device to which mount the camera lens assembly, the specification of the encoder 104, etc.

In a portable personal device, in which the camera lens assembly 100 that has successfully passed through initial focusing is mounted, the lens and particularly the lens assembly 101 is positioned in an initial assembled state unless power is applied the camera lens assembly 100. When a user photographs a subject, power is applied to the camera lens assembly 100, and the control unit 21 applies a current of about 40 mA to the encoder 104. Upon being supplied with the current, the encoder 104 moves the lens assembly 101 to the initial focusing position according to an offset value stored in the E-fuse memory 25. In this way, the camera lens assembly 100 is brought into a photographing standby mode.

In the photographing standby mode, a distance from the camera lens assembly 101 to a subject is detected by a separate sensor, and the control unit 21 generates a signal for driving the encoder 104 according to the detected distance, thereby adjusting the position of the lens assembly 101. This adjustment is easily understood by those skilled in the art, so a detailed description thereof is omitted herein.

As mentioned above, in order to perform initial focusing, a certain amount of current must be supplied to the encoder 104 whenever power is applied to the camera lens assembly 100. However, since a current above the certain amount must be substantially applied to the camera lens assembly 100 in the photographing standby mode, the power consumed for initial focusing in the camera lens assembly according to the present invention can be considered substantially negligible.

While the present invention has been shown and described with reference to certain embodiments thereof, it will be understood by those skilled in the art that various changes in form and details may be made therein without departing from the spirit and scope of the invention as defined by the appended claims and equivalents thereof. For example, although an encoder is utilized as a driving unit for initial focusing and focusing during photographing above, a Voice Coil Motor (VCM) may also be used in the actual product manufacture.

What is claimed is:

1. A focusing method for a camera lens assembly, the focusing method comprising:
   assembling a lens and a camera device;
   measuring an actual distance between the lens and the camera device in a position where the lens and the camera device are assembled;
   inputting an offset value, which is a difference between the measured actual distance and a focal length of the lens; and
   when power is applied to the camera lens assembly, adjusting the distance between the lens and the camera device according to the input offset value, such that the distance between the lens and the camera device is set equal to the focal length of the lens.

2. The focusing method as claimed in claim 1, wherein the offset value is stored in an Electrical fuse (E-fuse) memory incapable of additional writing to the memory subsequent to an initial input to the memory.

3. The focusing method as claimed in claim 1, wherein measuring the actual distance is performed using a position sensor to detect a position of the lens in an assembled state of the lens and the camera device.

4. The focusing method as claimed in claim 3, wherein a hall sensor is used as the position sensor.

5. The focusing method as claimed in claim 1, wherein adjusting the distance between the lens and the camera device comprises moving the lens in an optical axis direction thereof.

6. The focusing method as claimed in claim 5, wherein, in adjusting the distance between the lens and the camera device, the lens is moved in the optical axis direction thereof by driving an encoder.

7. A camera lens assembly comprising:
   a housing including an upper cover and a lower cover;
   a lens assembly including at least one lens;
   a guide unit for movably guiding the lens assembly in an optical axis direction of the lens;
   a camera device provided on the lower cover; and
   an encoder for moving the lens in the optical axis direction thereof,
   wherein when power is applied to the camera lens assembly, the lens is moved by driving the encoder, so that a distance between the lens and the camera device is set equal to a focal length of the lens.

8. The camera lens assembly as claimed in claim 7, wherein the guide unit is formed integrally with the upper and lower covers respectively.

9. The camera lens assembly as claimed in claim 7, wherein the guide unit extends along the optical axis direction of the lens, and is positioned between the upper and lower covers.

10. The camera lens assembly as claimed in claim 9, wherein the guide unit is formed integrally with the upper and lower covers respectively.

11. The camera lens assembly as claimed in claim 7, further comprising:
    a control unit for generating an electrical signal to drive the encoder; and
    an Electrical fuse (E-fuse) memory for storing an offset, which is a difference between the focal length of the lens and a measured actual distance from the lens to the camera device.

12. The camera lens assembly as claimed in claim 11, wherein, when power is applied to the camera lens assembly, the control unit moves the lens by driving the encoder according to the offset value stored in the E-fuse memory.

13. The camera lens assembly as claimed in claim 11, wherein the control unit further comprises a position sensor for detecting a position of the lens in an assembled state of the lens and the camera device.

14. The camera lens assembly as claimed in claim 13, wherein the position sensor comprises a hall sensor.

* * * * *